(12) United States Patent
Jiang et al.

(10) Patent No.: US 11,118,646 B2
(45) Date of Patent: Sep. 14, 2021

(54) ACTIVE TUNED MASS DAMPER APPLIED TO OFFSHORE MONOPILE WIND TURBINE INSTALLATION

(71) Applicant: Dalian University of Technology, Dalian (CN)

(72) Inventors: Zhiyu Jiang, Dalian (CN); Zhengru Ren, Dalian (CN); Wei Shi, Dalian (CN); Dezhi Ning, Dalian (CN)

(73) Assignee: Dalian University of Technology, Dalian (CN)

( * ) Notice: Subject to any disclaimer, the term of this patent is extended or adjusted under 35 U.S.C. 154(b) by 197 days.

(21) Appl. No.: 16/495,022

(22) PCT Filed: Feb. 28, 2018

(86) PCT No.: PCT/CN2018/077522
§ 371 (c)(1),
(2) Date: Sep. 17, 2019

(87) PCT Pub. No.: WO2019/091021
PCT Pub. Date: May 16, 2019

(65) Prior Publication Data
US 2020/0271183 A1    Aug. 27, 2020

(30) Foreign Application Priority Data
Nov. 9, 2017   (CN) .......................... 201711099127.3

(51) Int. Cl.
*F16F 7/10* (2006.01)
*F03D 13/10* (2016.01)
(Continued)

(52) U.S. Cl.
CPC ............ *F16F 7/1005* (2013.01); *F03D 13/10* (2016.05); *F03D 13/25* (2016.05); *F16F 7/108* (2013.01);
(Continued)

(58) Field of Classification Search
CPC .......... F16F 7/1005; F16F 7/108; F16F 7/116; F16F 2222/08; F16F 2224/025;
(Continued)

(56) References Cited

U.S. PATENT DOCUMENTS 7,931,438 B2 * 4/2011 Schellings ................ F03D 1/00
416/1
10,180,170 B2 * 1/2019 Amdisen ............... E04H 9/0215
(Continued)

FOREIGN PATENT DOCUMENTS

| CN | 202783720 U | 3/2013 |
|----|-------------|--------|
| CN | 103967712 A | 8/2014 |
| CN | 104533724 A | 4/2015 |

*Primary Examiner* — Thomas W Irvin
(74) *Attorney, Agent, or Firm* — Muncy, Geissler, Olds & Lowe, P.C.

(57) ABSTRACT

An active tuned mass damper applied to the offshore monopile wind turbine belongs to the field of marine technology. A mass block is connected to the inner wall of the tower through a spring. The two ends of the damper and the force actuator are connected to the mass block and the inner wall of the tower, respectively. When the installation of tower is finished, the spring and the damper begin to work. The movement of mass block will partly offset the movement of the tower caused by the wave force. The force actuator starts to work before the mating. The exact position of the nacelle can be obtained from the Global Positioning System (DGPS). The position of tower can be adjusted in the horizontal plane through the force actuator. So, the offshore installation time for nacelle will be saved. The whole installation time and cost will also be reduced.

9 Claims, 3 Drawing Sheets

(51) Int. Cl.
  *F03D 13/25* (2016.01)
  *F16F 7/108* (2006.01)
  *F16F 7/116* (2006.01)

(52) U.S. Cl.
  CPC .......... *F16F 7/116* (2013.01); *F16F 2222/08* (2013.01); *F16F 2224/025* (2013.01)

(58) Field of Classification Search
  CPC .......... F03D 13/10; F03D 13/25; F03D 13/35; F05B 2260/964
  See application file for complete search history.

(56) References Cited

U.S. PATENT DOCUMENTS

| | | | |
|---|---|---|---|
| 10,774,893 B2* | 9/2020 | Bergua | F03D 80/00 |
| 2007/0182162 A1* | 8/2007 | McClintic | F03D 1/0608 |
| | | | 290/55 |
| 2008/0145222 A1* | 6/2008 | Schellings | F03D 80/00 |
| | | | 416/31 |
| 2012/0107116 A1* | 5/2012 | Obrecht | F03D 7/0296 |
| | | | 416/1 |
| 2016/0021834 A1 | 1/2016 | Petros | |
| 2017/0037832 A1* | 2/2017 | Friedrich | B63B 21/50 |
| 2018/0017125 A1* | 1/2018 | Amdisen | F16F 7/10 |
| 2018/0355936 A1* | 12/2018 | Bergua | F03D 80/00 |
| 2020/0158083 A1* | 5/2020 | Nitsche | F03D 13/20 |
| 2020/0269960 A1* | 8/2020 | Boo | B63B 39/00 |
| 2020/0284315 A1* | 9/2020 | Rumler | F16F 15/023 |

\* cited by examiner

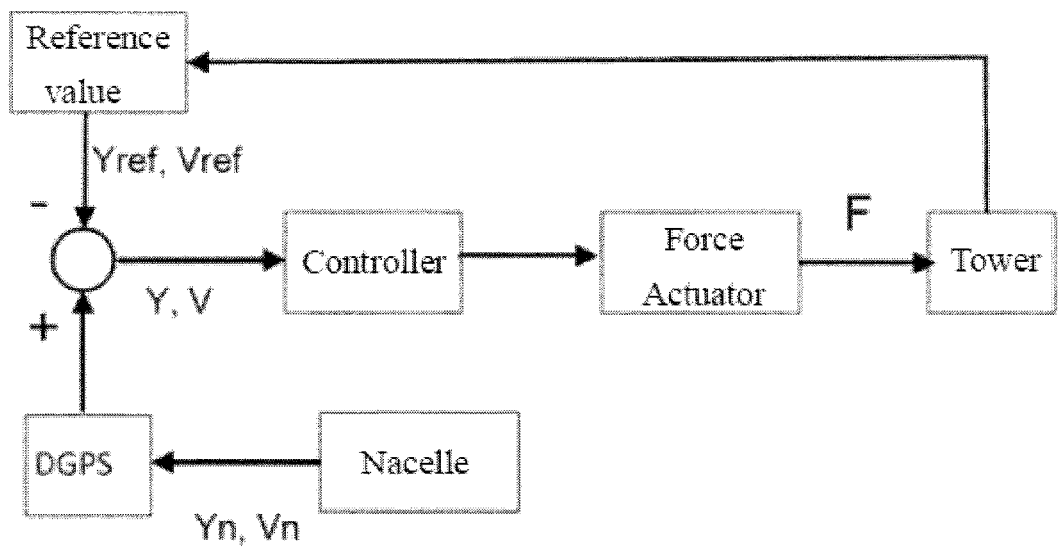
Figure 3
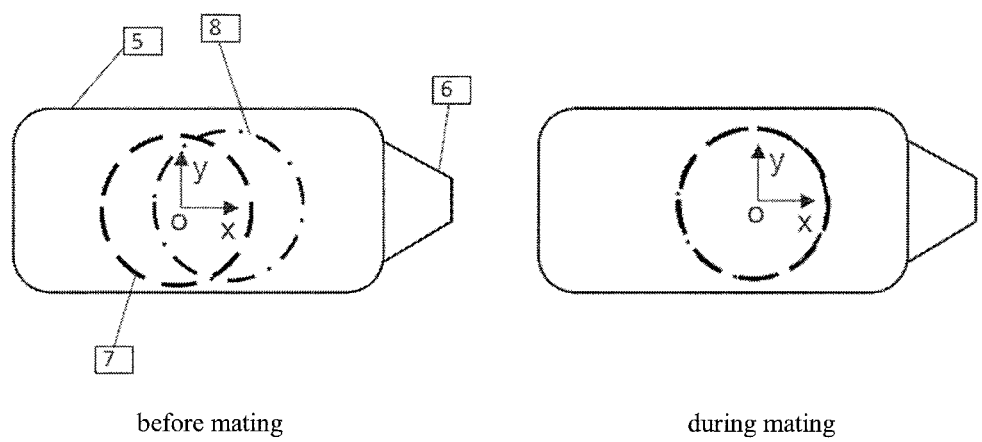
before mating | during mating
Figure 4(a) | Figure 4(b)

ACTIVE TUNED MASS DAMPER APPLIED TO OFFSHORE MONOPILE WIND TURBINE INSTALLATION

TECHNOLOGY FIELD

The present invention belongs to the field of marine technology, and a mechanical device is proposed to improve the large offshore monopile wind turbine installation efficiency.

BACKGROUND

According to the support structure, the offshore wind turbine now can be divided into fixed wind turbine and floating wind turbine. The existing offshore wind farm mainly uses the fixed type and focus on the shallow sea whose water depth is within 30 in. Monopile-type wind turbines have economic advantages because of the simple type and easy installation. Since the area limitation of the shallow sea area, some countries in Europe have planned to select site for the founding the monopile wind farm in the area with more than 40 in water depth.

The installation mode of the monopile wind turbine includes hoisting by parts and assembly hoisting. For large wind turbines, the main installation method is to use jack-up vessels for transporting several wind turbines. In order to use the deck space effectively, individual blades, towers and cabins are stored separately. During the installation process, the jack-up platform's legs are inserted into the seabed and the platform is lifted above the sea level to avoid the influence of the wave force, which will provide a stable platform for the crane operation. Then, the hoisting and the mating of the foundation, tower, nacelle and the blades follow in turn.

A crane is used for hoisting of the nacelle. The movement of the nacelle is controlled by vertical and horizontal tugger lines until the complete alignment of the circular holes at the nacelle bottom with the tower. During the hoisting process, the wind load acting on the nacelle will change due to the turbulent wind, and the nacelle will move. At the same time, the monopile will vibrate because of the wave forces, which will cause vibration of the tower top as well. During the mating process, since it is difficult to align the positions, multiple crew members are needed for the manual assistance operation. It takes long time. As the appearance of the extra-large monopile wind turbines (diameters up to 8 in) and the increase of the water depth (more than 40 in), the wave forces acting on the monopile and the movement of the tower are expected to increase during the mating process. So, the installation cost for the offshore wind turbine will escalate further.

SUMMARY

The present invention aims at providing an assistant device for the nacelle installation and mating of the nacelle. Using this device, the tower flange and the circular hole at the bottom of the nacelle could be mated quickly.

The technical solution of the present invention:

An active tuned mass damper suitable for the offshore monopile wind turbine includes mass block 8, spring 9, damper 10, force actuator 11, controller, electric motor and battery installed on tower 7, as well as the sensor (Differential Global Positioning System DGPS) installed in the nacelle 5.

The mass block 8 is connected to the inner wall of tower 7 by the spring 9. The two ends of damper 10 and force actuator 11 are connected to mass block 8 and inner wall of the tower 7 respectively. The selection of the mass block 8, spring 9, damper 10 could be done according to the vibration theory. And it could be optimized and adjusted based on the first order natural frequency of the tower 7. When the installation of tower 7 is finished, the spring 9 and damper 10 start to work. The movement of tower 7 caused by the wave force will be partly offset by the movement of mass block 8. Before mating, force actuator 11 begins to work. The precise position of nacelle 7 can be obtained from the DGPS. The position of tower 7 in the horizontal plane is adjusted through the force actuator.

The mass block 8 could be solid or liquid unit.

The material of damper 10 is rubber.

The force actuator 11 is driven by the controller and the small electric motor located in the tower 7.

At the crucial moment before the mating of the nacelle 5, tower 7 may have large planar motion affected by the wave force. The planar movement of the tower 7 is reduced through the mass block 8-spring 9-the damper 10. By the active control of force actor 11, the position of tower 7 is adjusted according the nacelle 5 to facilitate the mating.

After the docking of nacelle 5 and the tower 7, nacelle 5 is fixed to the tower 7 by the bolts. Then the active force actuator 11 is turned off. The damping system, comprising mass block 8-spring 9 and-damper 10, plays a pivotal role during the running of the whole wind turbine, which will improve the fatigue life of the monopile structure.

The present invention is suitable for the MW-sized horizontal-axis wind turbines. The water depth is more than 30 m.

The beneficial effects of the present invention:

(1) The installation and the debugging of the active tuned mass damper could be finished during the onshore construction of nacelle components. The components of the damper, force actor, mass block, spring, damper, and the controller, electric motor, battery, are mature industrial productions, which is easy to carry out.

(2) Reduce the off-shore nacelle installation time. Save the whole installation time and cost.

(3) When the nacelle is being mated, the process is autonomous which saves the labor cost. The operation safety is also well improved.

DESCRIPTION OF DRAWINGS

FIG. 3, the diagram of the force actuator feedback.

FIGS. 4(a) and 4(b) of the nacelle mating.

In the figures: 1 Jack-up installation vessel; 2 Crane; 3 Vertical tugger line; 4 Horizontal tugger line; 5 Nacelle; 6 Hub; 7 Tower; 8 Mass block; 9 Spring; 10 Damper; 11 Force actuator; 12 Tower roof; 13 Flange hole; 14 Blade; 15 Monopile; 16 Sea level; 17 Seabed.

DETAIL DESCRIPTION

The specific embodiments of the present invention are further described below in conjunction with the drawings and technical solutions.

Figure 1:
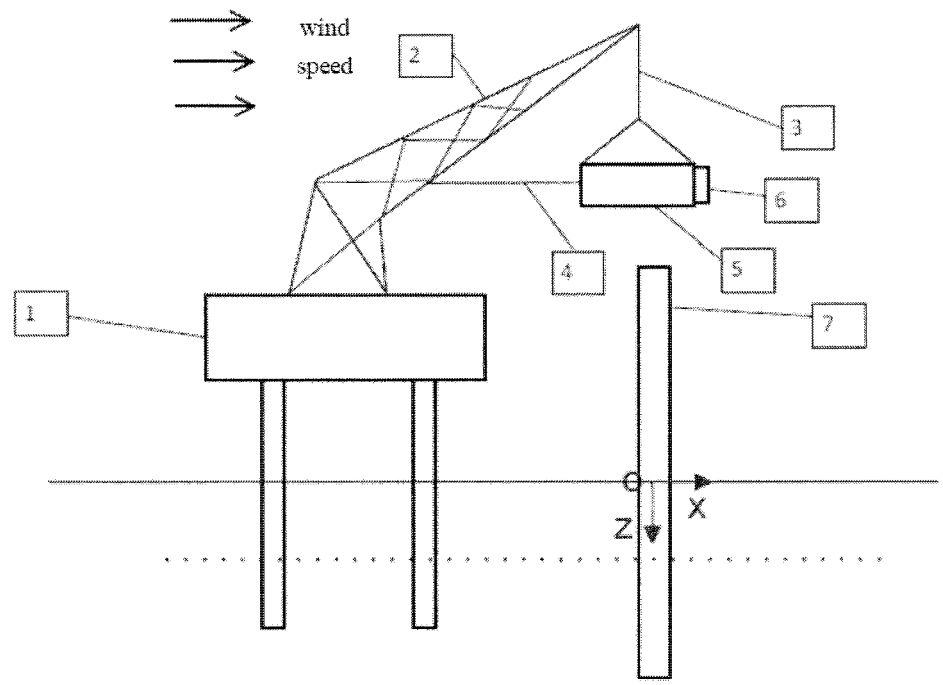
FIG. 1, side view of the off-shore single blade installation (x-z plane).

The active tuned mass damper applied to offshore monopile wind turbine installation is carried out as follows:

FIG. 1 is the side view of the offshore single blade installation (x-z plane). The wind speed direction is x direction. The installed wind turbine is 6 MW level whose nacelle length is 10 m and weight is 360t. The height of the nacelle is 100 m above the sea level. The nacelle is connected to the crane by two horizontal tugger lines and a vertical tugger line. The horizontal tugger lines are used to limit the movement of the blade on the x-y plane. Lift the nacelle from the jack-up installation vessel gradually above the tower and prepare for the mating process.

Figure 2:
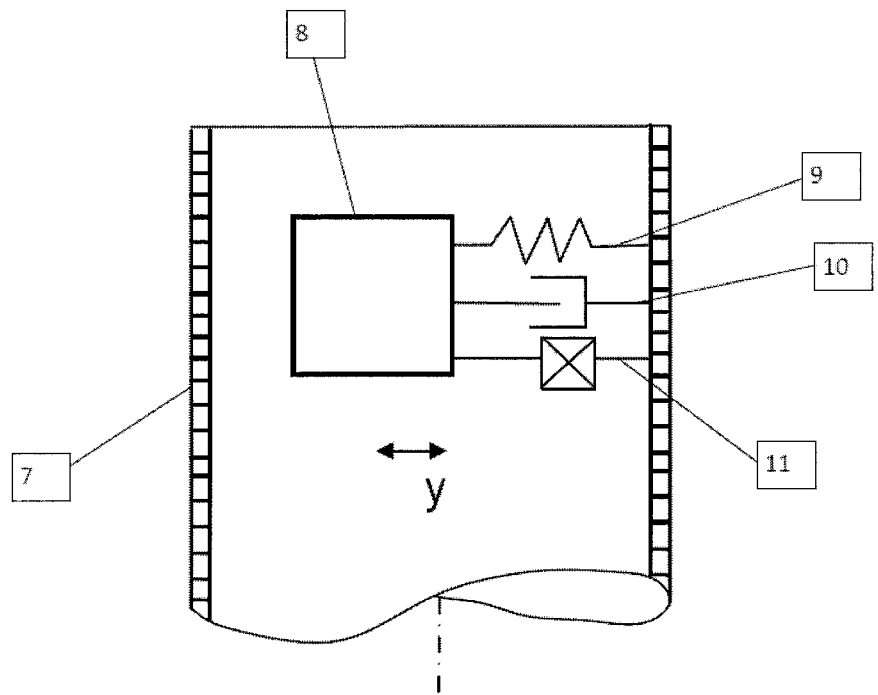
FIG. 2, the diagram of the main components of the active tuned mass damper.

FIG. 2 is the diagram of the main components of the active tuned mass damper. The weight of the mass block is 20 ton. The spring rigidity is 5000 N/m. The damping coefficient is 9000 Ns/m. The corresponding natural frequency is 0.28 Hz. The force actuator could be a piston structure and driven by the electric motor. The parameter of the force actuator can be optimally designed according to the wind turbine structure.

FIG. 3 is the diagram of the force actuator feedback. At each moment, the actuator calculates the force needed for the next moment according to the position difference between the tower and the nacelle. Adjust the tower position by the force actuator.

FIGS. 4(a) and 4(b) present views of the nacelle's installation. Before the mating, the circular holes at the bottom of the nacelle are very close to the top of the tower. But it is not easy for the point-to-point mating. Usually, labors are needed to complete the mating. If the active tuned mass damper is used, the nacelle and the tower could be fully aligned t under the assistance of the force actuator.

Figure 5:
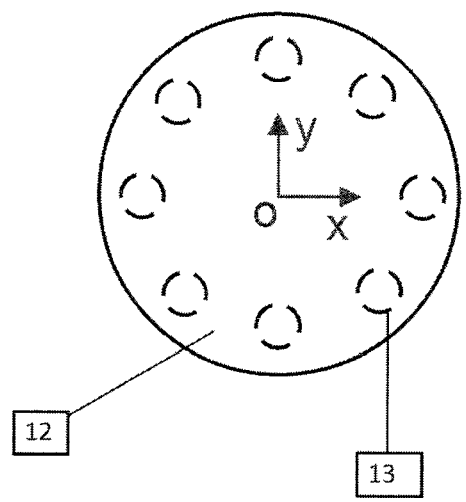
FIG. 5, the nacelle profile after mating.

FIG. 5 is the nacelle profile after mating. The nacelle and the top of the tower is fixed by bolts through the flange hole.

Figure 6:
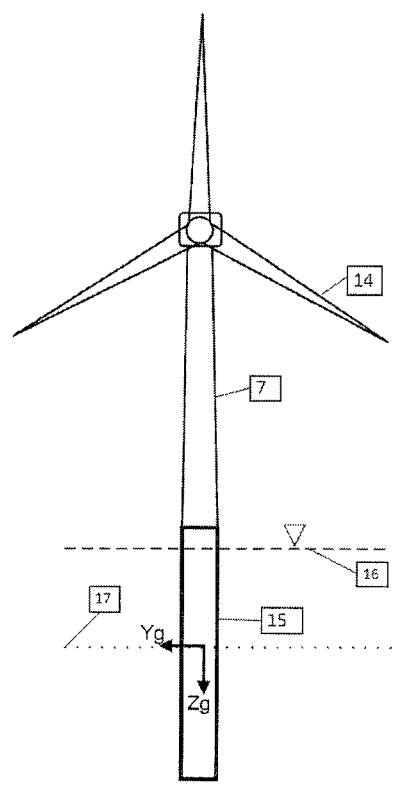
FIG. 6, the front view of the off-shore monopile wind turbine after mating.

FIG. 6 is an offshore 6 MW wind turbine after installation.

The invention claimed is:

1. An active tuned mass damper suitable for an offshore monopile wind turbine, comprising a mass block, a spring, a damper, a force actuator, a controller, an electric motor and a battery installed on a tower, and a sensor, which is a Differential Global Positioning System (DGPS), installed in a nacelle;

wherein the mass block is connected to an inner wall of the tower by the spring, two ends of the damper and the force actuator are connected to the mass block and the inner wall of the tower respectively; the mass block, the spring, the damper is selected according to the vibration theory, and optimized and adjusted based on a first structural natural frequency of the tower; when the installation of the tower is finished, the spring and the damper start to work; movements of the tower caused by a wave force will be partly offset by the movement of the mass block; before mating of the nacelle and the tower, the force actuator begins to work; the precise position of the nacelle can be obtained by the DGPS, and the position of the tower in the horizontal plane is adjusted through the force actuator.

2. The active tuned mass damper according to claim 1, wherein the mass block is solid or liquid unit.

3. The active tuned mass damper according to claim 2, wherein the damper is made of rubber.

4. The active tuned mass damper described in claim 3, wherein the force actuator is driven by the controller and the electric motor located in the tower.

5. The active tuned mass damper according to claim 2, wherein the force actuator is driven by the controller and the electric motor located in the tower.

6. The active tuned mass damper according to claim 1, wherein the damper is made of rubber.

7. The active tuned mass damper described in claim 6, wherein the force actuator is driven by the controller and the electric motor located in the tower.

8. The active tuned mass damper described in claim 1, wherein the force actuator is driven by the controller and the electric motor located in the tower.

9. The active tuned mass damper according to claim 1, wherein the force actuator is driven by the controller and the electric motor located in the tower.

* * * * *